United States Patent
Sebastian et al.

(10) Patent No.: US 12,148,226 B2
(45) Date of Patent: Nov. 19, 2024

(54) METHOD AND DEVICE FOR CLASSIFYING END-TO-END WEATHER AND ROAD CONDITIONS IN REAL TIME BY USING LIDAR

(71) Applicant: Hyundai Mobis Co., Ltd., Seoul (KR)

(72) Inventors: George Sebastian, Eschborn (DE); Teja Vattem, Frankfurt am Main (DE); Luka Lukic, Hofheim am Taunus (DE)

(73) Assignee: Hyundai Mobis Co., Ltd., Seoul (KR)

( * ) Notice: Subject to any disclaimer, the term of this patent is extended or adjusted under 35 U.S.C. 154(b) by 376 days.

(21) Appl. No.: 17/561,970

(22) Filed: Dec. 26, 2021

(65) Prior Publication Data

US 2023/0206653 A1    Jun. 29, 2023

(51) Int. Cl.

| | |
|---|---|
| *G06F 11/30* | (2006.01) |
| *G01S 17/89* | (2020.01) |
| *G01S 17/95* | (2006.01) |
| *G06V 10/764* | (2022.01) |
| *G06V 20/56* | (2022.01) |
| *B60W 60/00* | (2020.01) |

(52) U.S. Cl.
CPC .......... *G06V 20/588* (2022.01); *G01S 17/89* (2013.01); *G01S 17/95* (2013.01); *G06V 10/764* (2022.01); *B60W 60/001* (2020.02); *B60W 2420/408* (2024.01); *B60W 2555/20* (2020.02)

(58) Field of Classification Search
CPC .................................................... G06V 20/588
See application file for complete search history.

(56) References Cited

U.S. PATENT DOCUMENTS

| | | | |
|---|---|---|---|
| 2016/0178802 A1 | 6/2016 | Stainvas Olshansky et al. | |
| 2018/0079424 A1 | 3/2018 | Myers et al. | |
| 2019/0294869 A1* | 9/2019 | Naphade | G06V 20/54 |
| 2019/0383904 A1* | 12/2019 | Harrison | G01S 13/931 |
| 2021/0213955 A1 | 7/2021 | Zhao et al. | |

OTHER PUBLICATIONS

Vargas Rivero, et al. "Weather Classification Using an Automotive LIDAR Sensor Based on Detections on Asphalt and Atmosphere." Sensors 20.15 (2020): 4306., (20 pages in English).
Sebastian, George, et al. "RangeWeatherNet for LiDAR-only weather and road condition classification." 2021 IEEE Intelligent Vehicles Symposium (IV). IEEE, 2021., (8 pages in English).
Extended European search report issued on Jun. 17, 2022, in counterpart European Patent Application No. 21217715.8 (9 pages in English).

* cited by examiner

*Primary Examiner* — Phuong Huynh
(74) *Attorney, Agent, or Firm* — NSIP Law (57) ABSTRACT

A driving environment classification device and method are provided, where the method includes a data collector configured to collect a three-dimensional (3-D) point cloud from a light detection and ranging (LiDAR) sensor, an image generator configured to generate a range image based on the 3-D point cloud, an image processor configured to extract at least one feature from the range image by inputting the range image and a pre-learnt at least one encoder weight to a pre-trained encoder, and a driving environment determiner configured to classify a driving environment by inputting the at least one feature and a pre-learnt at least one classification weight to a pre-trained driving environment classification model.

14 Claims, 4 Drawing Sheets

METHOD AND DEVICE FOR CLASSIFYING END-TO-END WEATHER AND ROAD CONDITIONS IN REAL TIME BY USING LIDAR

BACKGROUND

1. Field

The following description relates to a method and device for classifying end-to-end weather and road conditions in real time by using LiDAR.

2. Discussion of Related Art

Contents described hereinafter simply provide only background information related to an embodiment of the present disclosure, and do not constitute a conventional technology.

A light detection and ranging (LiDAR) technology plays an important role in achieving higher-level autonomous driving. A LiDAR sensor is robust in a fine weather condition including a night scene. However, the LiDAR sensor tends to have its performance degraded in severe weather conditions, such as fog, rain, and snow.

An autonomous vehicle dependent on LiDAR needs to be able to evaluate a limit of the vehicle in real time and to provide alarm in a critical situation. Furthermore, the vehicle needs to be able to solve a performance degradation problem, that is, a factor which may cause a danger in a severe weather condition scenario. From the both viewpoint of performance and safety, when a LiDAR system is disposed in an autonomous vehicle, the system needs to be able to evaluate an environment in which a sensor operates. A function for individually classifying weather conditions with respect to each of sensors also guarantees redundancy required for a system whose safety is important and removes cross dependency between sensors. Furthermore, a function for classifying various road conditions, such as full snow coverage, slushy, dryness, and dampness, may assist a lane keeping assist system (LKAS) or a lane departure warning system (LDWS) in addition to an electronic stability control (ESC) application.

There have been proposed a plurality of methods of classifying various weather and road conditions by using only a point cloud generated by three-dimensional (3-D) LiDAR. A conventional approach depends on a set of hand-engineered features or hand-crafted features extracted from a specific region of interest (ROI) of a point cloud. However, in general, a predefined static ROI is not sufficient as a representation method for handling a dynamic and actual situation and a complicated road topology. The predefined static ROI is defined as a fixed cuboid area having the longest dimension in a boresight direction of a vehicle. A complicated road topology includes a crossroad and a freeway exit, for example. In order to handle a dynamic and actual situation and a complicated road topology, an approach based on both a wide field of view (FoV) and holistic perceptual analysis is necessary. Moreover, some hand-crafted features according to a proposed conventional method may be very sensitive to an outlier which naturally occurs in a dynamic and actual road scenario. Furthermore, hand-crafted features generated by the conventional method can capture a change in the point density, a range, and a change in the intensity to some level. Finally, a multi-task method capable of simultaneously predicting both weather and road conditions from a 3-D LiDAR point cloud has not been known. If tasks are individually performed according to a conventional paradigm using a conventional hand-feature-engineered method, there is a problem in that computation overhead becomes almost doubled.

A known problem of a hand-crafted approach may be solved by proposing an end-to-end deep learning approach. In the end-to-end deep learning approach, associated features are learnt by a model based on an automatic and data-driven method. An ROI and an independent multi-task, an end-to-end, and a data-driven approach use a total FoV. Weather and road conditions may be simultaneously classified by using only a 3-D LiDAR point cloud. However, an end-to-end multi-task approach has not yet been proposed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a driving environment classification device, including a data collector configured to collect a three-dimensional (3-D) point cloud from a light detection and ranging (LiDAR) sensor, an image generator configured to generate a range image based on the 3-D point cloud, an image processor configured to extract at least one feature from the range image by inputting the range image and a pre-learnt at least one encoder weight to a pre-trained encoder, and a driving environment determiner configured to classify a driving environment by inputting the at least one feature and a pre-learnt at least one classification weight to a pre-trained driving environment classification model.

The driving environment determiner may be configured to estimate at least one confidence score by inputting the at least one feature and the at least one classification weight to the driving environment classification model, and determine, as the driving environment, a driving environment class having a highest confidence score as an output value, wherein the at least one confidence score comprises a probability value for each driving environment class.

The driving environment classification model may include a weather classification model to classify weather and a road condition classification model to classify a condition of a road on which a vehicle travels, and the at least one classification weight may include a first weight pre-learnt with respect to the weather classification model and a second weight pre-learnt with respect to the road condition classification model.

The driving environment class may include a weather classes and a road condition class, and the at least one confidence score may include a weather confidence score corresponding to the weather class and a road condition confidence score corresponding to the road condition class.

The driving environment classification device may include an estimated value calculator configured to calculate a predicted confidence score by inputting a training data set to a classification neural network comprising a preset encoder and a preset driving environment classification model, a loss calculator configured to calculate a loss between a truth confidence score and the predicted confidence score using a preset loss function, and a model trainer configured to train the classification neural network by updating an encoder weight included in the preset encoder and a classification weight included in the preset driving environment classification model using a back-propagation algorithm based on the loss.

The loss calculator may be configured to calculate the loss using a cross entropy error (CEE) for predicting categorical data as the loss function.

The estimated value calculator may be configured to calculate predicted confidence scores for weather and road conditions based on a preset first weight and a preset second weight, respectively, the loss calculator may be configured to calculate the loss using a joint loss function in which a level of contribution of each loss function is adjusted based on a first loss function for weather prediction and a second loss function for road condition prediction, and the model trainer may be configured to train the classification neural network by recursively updating at least one weight included in the classification neural network based on a gradient of the joint loss function.

In another general aspect, there is provided a driving environment classification method performed by a processor-implemented driving environment classification device, the driving environment classification method comprising collecting a three-dimensional (3-D) point cloud from a LiDAR sensor, generating a range image based on the 3-D point cloud, extracting at least one feature from the range image by inputting the range image and a pre-learnt at least one encoder weight to a pre-trained encoder, and classifying a driving environment by inputting the at least one feature and a pre-learnt at least one classification weight to a pre-trained driving environment classification model.

The classifying of the driving environment may include estimating at least one confidence score by inputting the at least one feature and the at least one classification weight to the driving environment classification model, and determining, as the driving environment, a driving environment class having a highest confidence score as an output value, wherein the at least one confidence score comprises a probability value for each driving environment class.

The driving environment classification model may include a weather classification model for classifying weather and a road condition classification model for classifying a condition of a road on which a vehicle travels, and the at least one classification weight may include a first weight pre-learnt with respect to the weather classification model and a second weight pre-learnt with respect to the road condition classification model.

The driving environment class may include a weather classes and a road condition class, and the at least one confidence score may include a weather confidence score corresponding to the weather class and a road condition confidence score corresponding to the road condition class.

The driving environment classification method may include calculating a predicted confidence score by inputting a training data set to a classification neural network comprising a preset encoder and a preset driving environment classification model, calculating a loss between a truth confidence score and the predicted confidence score using a preset loss function, and training the classification neural network by updating an encoder weight included in the preset encoder and a classification weight included in the preset driving environment classification model using a back-propagation algorithm based on the loss.

The calculating of the loss may include calculating the loss using a cross entropy error (CEE) for predicting categorical data as the loss function.

The calculating of the predicted confidence score may include calculating predicted confidence scores for weather and road conditions based on a preset first weight and a preset second weight, respectively, the calculating of the loss may include calculating the loss using a joint loss function in which a level of contribution of each loss function is adjusted based on a first loss function for weather prediction and a second loss function for road condition prediction, and the training of the classification neural network may include training the classification neural network by recursively updating at least one weight included in the classification neural network based on a gradient of the joint loss function.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (i), (i), (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

The present disclosure proposes a new multi-task deep learning-based approach for simultaneously classifying weather and road conditions from a 3-D LiDAR point cloud. In the present disclosure, weather and road conditions may be collectively called a driving environment.

A detailed description to be disclosed hereinafter along with the accompanying drawings is intended to describe exemplary embodiments of the present disclosure and is not intended to indicate a sole embodiment on which the present disclosure may be practiced.

Figure 1:
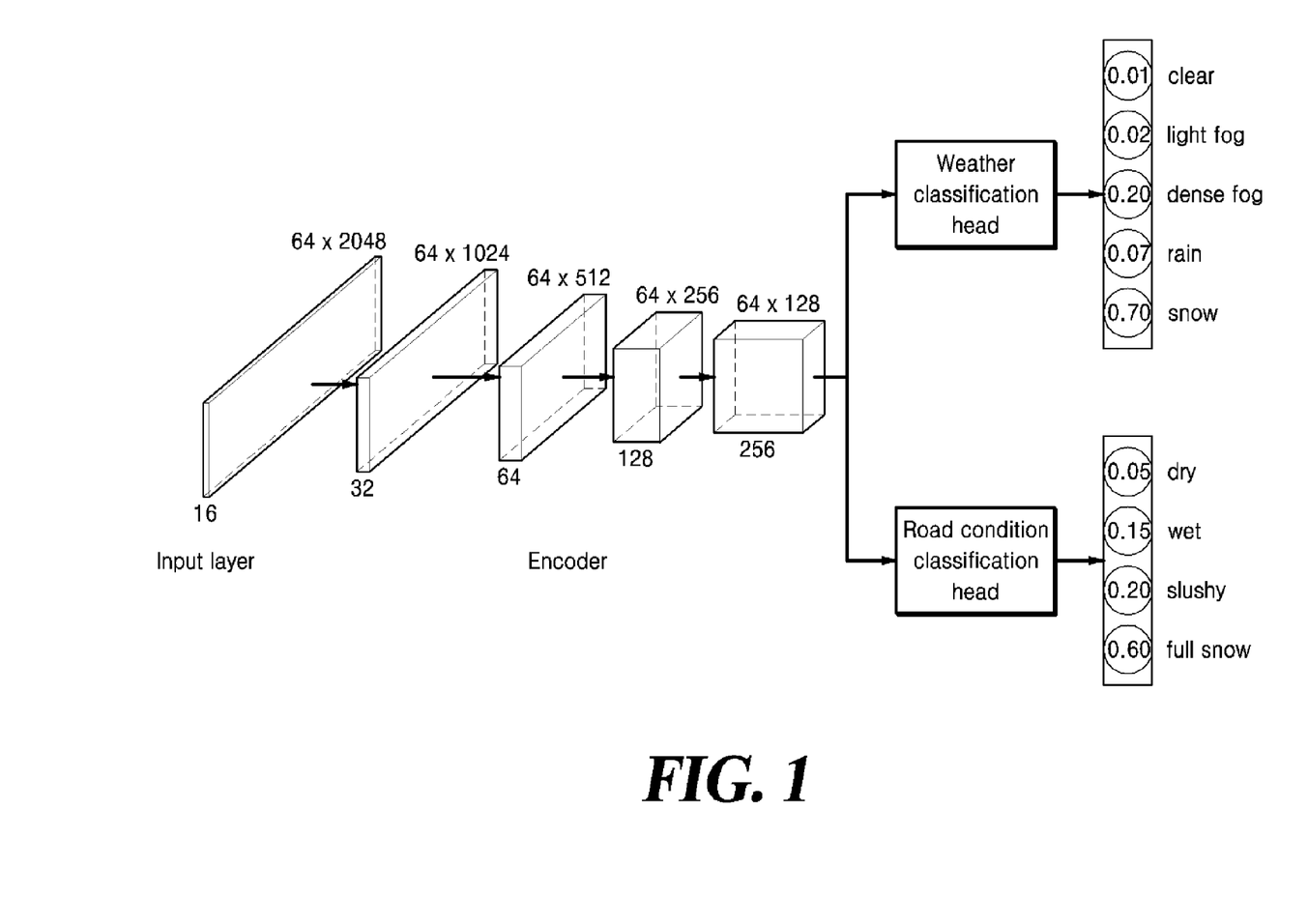
FIG. 1 is a concept view illustrating architecture of a classification neural network according to an embodiment of the present disclosure.

FIG. 1 is a concept view illustrating architecture of a classification neural network according to an embodiment of the present disclosure.

FIG. 1 illustrates architecture of a classification neural network for constructing a model for classifying a driving environment. The classification neural network may be a deep neural network (DNN), that is, an artificial neural network including at least one hidden layer between an input layer and an output layer, for example. The classification neural network may remove the necessity for a hand-crafted feature and perform learning based on a data-driven automated method.

In FIG. 1, a data processing flow proceeds from the left to the right. As a part of a perception stack of an ECU, a point cloud is provided to a multi-task deep learning model for simultaneously classifying weather and road conditions in real time. The input point cloud may be represented like (x, y, z, intensities). The 3-D point cloud may be inputted from the output of a LiDAR optical front end to a classification neural network. In this case, a batch size is set to 1. The input 3-D point cloud is first pre-processed to generate a range image. The range image is supplied to a lightweight convolutional encoder or a backbone. Classification heads are placed behind the backbone. As may be seen from FIG. 1, two classification heads are connected to the end of the lightweight convolutional encoder. The classification heads may include a weather classification head or a road condition classification head. A driving environment classification model pre-trained to classify a driving environment may simultaneously classify a weather condition and/or a road condition by using a point cloud obtained by a 3-D LiDAR sensor included in a vehicle.

The weather classification head may be a weather classification model pre-trained to estimate a weather confidence score. A driving environment classification device may classify weather around a vehicle as one of various weather classes based on a weather confidence score. In this case, the weather classes include labels related to weather and outputted as classification results, for example, clear, dense fog, light fog, rain, and snow. The weather classification head is designed using a convolution layer instead of a fully-connected layer, and thus can significantly reduce the number of parameters. A 1×1 convolution layer within the weather classification head reduces the depth of a feature map while maintaining a feature size. After a subsequent max-pooling operation, a global averaging operation and a softmax operation are performed. The output of the classification neural network is a set of classification scores for a weather class.

The classification neural network may classify a road condition by using the road condition classification head, that is, another classification head added to the backbone. An operating method of the road condition classification head is similar to the weather classification head. The backbone or the encoder is shared between the road condition classification head and the weather classification head. The backbone or the encoder is jointly trained for road condition classification and weather classification. The road condition classification head may be a road condition classification model pre-trained to estimate a road condition confidence score. The driving environment classification device may classify various road condition classes based on a road condition confidence score. In this case, the road condition classes include labels related to road conditions and outputted as classification results, for example, dryness, dampness, slushy and full snow coverage. The weather class and the road condition class may be collectively called a driving environment class.

Figure 2:
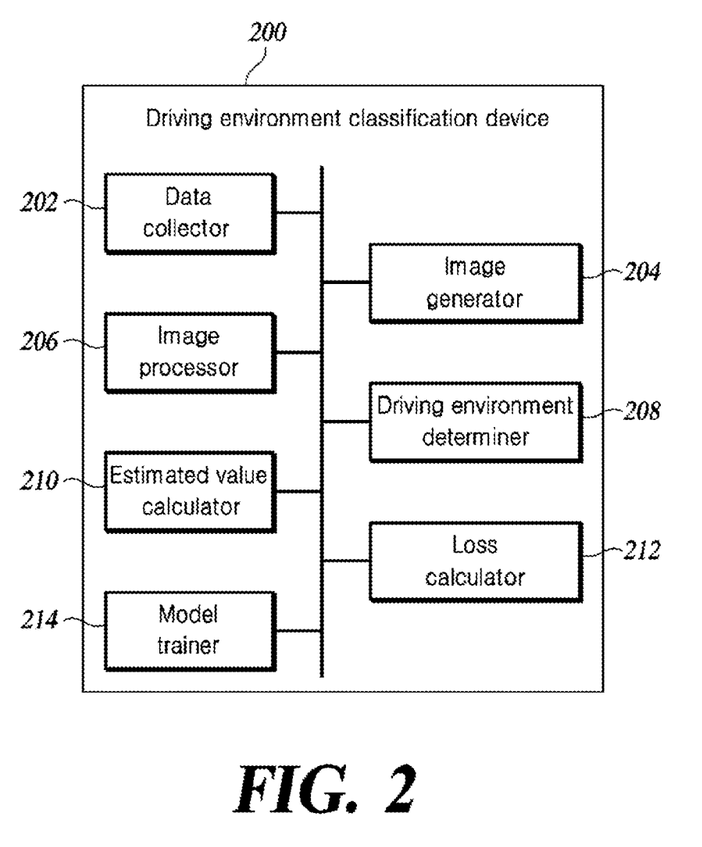
FIG. 2 is a block diagram for describing a driving environment classification device according to an embodiment of the present disclosure.

FIG. 2 is a block diagram for describing a driving environment classification device according to an embodiment of the present disclosure.

A driving environment classification device 200 according to an embodiment of the present disclosure includes some or all of a data collector 202, an image generator 204, an image processor 206, a driving environment determiner 208, an estimated value calculator 210, a loss calculator 212, and a model trainer 214.

The driving environment classification device 200 illustrated in FIG. 2 is an embodiment of the present disclosure, and all the blocks illustrated in FIG. 2 are not essential elements. In another embodiment, some blocks included in the driving environment classification device 200 may be added, changed, or deleted. For example, the driving environment classification device 200 may provide a real-time end-to-end weather and road condition classification function, that is, an object of the present disclosure, even without the estimated value calculator 210, the loss calculator 212, and the model trainer 214. The driving environment classification device 200 may further include a communication interface (not illustrated) which performs the transmission and reception of data to and from a LiDAR sensor or at least one ECU included in a vehicle. The communications interface may receive a LiDAR point cloud over a vehicle network, for example, through Ethernet. The communications interface may provide weather and road condition classification results to a sensor fusion system for the LKAS or the LDWS by streaming the weather and road condition classification results to a bus. The communications interface may stream the classification results to vehicle control logic including an ESC application through the bus. That is, after being obtained, the classification results may be used to activate the fail-safe function of a LiDAR perception ECU. For example, the classification results may be provided to the ESC application for high-speed adaptive braking and suspension control on an icy ground or a wet road condition. The confidence score may be provided to the sensor fusion system and used to assign a weight to a confidence of sensor reading.

An operation of the driving environment classification device 200 may be divided into a training operation of learning neural network parameter and an inference operation of classifying weather and road conditions. The inference process may be a process performed after the driving environment classification device is disposed in a vehicle. The driving environment classification device 200 may be disposed in the vehicle, and may classify weather and road conditions in real time by using the classification models. The elements included in the driving environment classification device 200 are described below with reference to FIG. 2. Each of the elements included in the driving environment classification device 200 may be a logical element and may be implemented as a processor executes at least one instruction stored in a memory.

The data collector 202 collects a 3-D point cloud from a LiDAR sensor. The LiDAR sensor monitors the outside by using a light beam discharged by a set of discrete angle arrays and reflected in the vertical and horizontal directions of an FoV. The LiDAR point cloud is obtained in each cycle from an optical sensor front end. That is, the LiDAR sensor measures a surrounding environment in the form of the 3-D point cloud whose intensity can be measured.

The image generator 204 generates a range image based on the 3-D point cloud. The entire 3-D LiDAR point cloud is spherically projected onto an intermediate 2-D pseudo-image called the range image. When a plurality of points is projected onto the same location, attributes of a point having the closest distance from a range image are selected. The range image includes five feature channels, and may be represented like (d, i, x, y, z). In this case, d is the distance of a returned point, and i means the intensity of the returned point. x, y, z mean Cartesian coordinates of the returned point represented within a LiDAR reference frame. The range image may be represented like "Img."

The image processor 206 extracts at least one feature included in the range image by inputting the range image and a pre-learnt at least one encoder weight to a pre-trained encoder. The input of the encoder, that is, a network backbone, is a tensor of an (N, H, W, C) unit. N means a batch size, and W is the width of the range image. H means the height of the range image. C means the number of feature channels.

The driving environment determiner 208 classifies a driving environment by inputting the at least one feature and the pre-learnt at least one classification weight to the pre-trained driving environment classification model. Specifically, the driving environment determiner 208 estimates at least one confidence score, that is, a probability value of each driving environment class, by inputting the extracted feature and the classification weight to the driving environment classification model. The driving environment determiner 208 determines, as a current driving environment of the vehicle, a driving environment class having the highest confidence score as an output value. In this case, the driving environment classification model includes a weather classification model for classifying weather and a road condition classification model for classifying a road condition of a road on which the vehicle travels. A classification weight includes a first weight pre-learnt with respect to the weather classification model and a second weight pre-learnt with respect to the road condition classification model. The driving environment class includes a weather classes and a road condition class. The weather class means at least one label about weather. The road condition class means at least one label about a road condition. The confidence score includes a weather confidence score and a road condition confidence score. The weather confidence score is a confidence score corresponding to each weather class. The road condition confidence score is a confidence score corresponding to each road condition class.

An operation of the driving environment determiner 208 may be formulated according to a mathematical representation method. The driving environment determiner 208 predicts a confidence score $c_i$ for each of a weather class and a road condition class. The confidence score has a value between 0 and 1. The confidence score indicates a probability estimation value corresponding to each class. Accordingly, the sum of confidence scores for classes becomes 1 according to Equation 1.

$$\sum_{i=0}^{K} c_i = 1 \qquad \text{[Equation 1]}$$

In Equation 1, K means the number of driving environment classes for a specific classification task. A method of outputting, by a classification neural network, for example, a DNN, a confidence score corresponding to each driving environment class may be represented using functions f, $G_1$ and $G_2$ in Equation 2.

[Equation 2]

$$\{c_i\}_{i=1}^{K_{weather}} = G_1(f(\text{Img};\theta);\varphi_1) \qquad (2a)$$

$$\{c_i\}_{i=1}^{K_{road}} = G_2(f(\text{Img};\theta);\varphi_2) \qquad (2b)$$

In this case, the function f means a deep learning model included in the encoder. The functions $G_1$ and $G_2$ mean the weather classification model and the road condition classification model, respectively. $c_i$ is a confidence score for each driving environment class. $K_{weather}$ and $K_{road}$ are the number of weather classes and the number of road condition classes, respectively. Img means a range image generated using a 3-D LiDAR point cloud. $\theta$ means at least one encoder weight learned in a training process. $\varphi_1$ and $\varphi_2$ mean at least one first weight pre-learnt with respect to the weather classification model and at least one second weight pre-learnt with respect to the road condition classification model, respectively. In this case, the first weight and the second weight may be collectively called a classification weight. The image processor 206 extracts at least one feature included in a range image by inputting Img and $\theta$ to a pre-trained encoder. The driving environment determiner 208 outputs a confidence score corresponding to each driving environment class by inputting, to the driving environment classification model, a feature outputted by the encoder and a pre-learnt classification weight. For example, the driving environment determiner 208 may output a weather confidence score corresponding to each weather class by inputting the extracted feature and the first weight to the weather classification model. The driving environment determiner 208 may output a road condition confidence score corresponding to each road condition class by inputting the extracted feature and the second weight to the road condition classification model. Final weather and road condition classes, that is, a current driving environment of the vehicle, are estimated by post-processing the confidence score as in Equation 3.

[Equation 3]

Weather class=argmax($\{c_i\}_{i=1}^{K_{weather}}$) (3a)

Road condition class=argmax($\{c_i\}_{i=1}^{K_{road}}$) (3b)

The estimated value calculator 210 calculates a predicted confidence score by inputting a training data set to a classification neural network including the preset encoder and the preset driving environment classification model. The estimated value calculator 210 calculates predicted confidence scores for weather and road conditions based on the preset first weight and the preset second weight, respectively. All data sets are composed of a plurality of batches and supplied to the classification neural network. In this case, each batch size may be N (N is a natural number). All the data sets are also provided with a ground truth labeled with respect to each frame. The truth label includes a truth confidence score for each class. The classification neural network is trained in a supervised manner. That is, a classification neural network learns it's parameters using labeled ground truth data. In each training batch, N point clouds are supplied from a train split to the classification neural network along with weather and road condition labels.

The loss calculator 212 calculates a loss, that is, an error between a truth confidence score and a predicted confidence score, by using a preset loss function. In an embodiment, the loss calculator 212 may use a cross entropy error (CEE) for predicting categorical data as a loss function in order to calculate a loss. A loss function for a weather confidence score estimate may be represented like Equation 4.

$$L_{weather} = \frac{1}{N}\sum_{n=1}^{N}\sum_{i=1}^{K} -w_i y_{ni} \log(c_{ni})$$ [Equation 4]

In Equation 4, $y_{ni}$ is a one-hot expression of an i-th weather label for an n-th sample within a batch. A one-hot vector means a vector generated by one-hot encoding. $w_i$ is a weight assigned to an i-th class among K weather classes. In a similar manner, the loss calculator 212 may calculate a loss of a confidence score predicted in relation to a road condition by using a loss function for a road condition confidence score estimate. In another embodiment, the loss calculator 212 may calculate a loss by using a joint loss function in which a level of contribution of each loss function has been adjusted based on a first loss function for weather prediction and a second loss function for road condition prediction. The joint loss function may be represented as a weighted combination of a weather classification loss and a road condition classification loss as in Equation 5. The classification neural network estimates a parameter by using a multi-task loss function.

$L_{joint} = \mu_1 * L_{weather} / \mu_2 * L_{road\ condition}$ [Equation 5]

In Equation 5, $\mu_1$ and $\mu_2$ are hyper-parameters each set to adjust a level of contribution of a loss function for the entire multi-task network. A gradient of the loss function may be used to recursively estimate the parameter θ of the classification neural network by using a back-propagation algorithm.

The model trainer 214 trains the classification neural network by updating at least one encoder weight included in the preset encoder and at least one classification weight included in the preset driving environment classification model by using the back-propagation algorithm based on the calculated loss. For example, the classification neural network may learn a weight by extracting a hierarchical task-specific feature by using the back-propagation algorithm. In another embodiment, the model trainer 214 may train the classification neural network by recursively updating at least one weight included in the classification neural network based on a gradient of the joint loss function. In this case, the weight means a parameter which may be learnt. In each batch, at least one weight is updated using a gradient descent algorithm in order to have a model converged. One full path for the entire train split of a data set is called an epoch. After a weight update is repeated during a plurality of epochs, a converged model is disposed in target hardware and used for an inference operation. That is, the inference operation may be performed within a vehicle.

Figure 3:
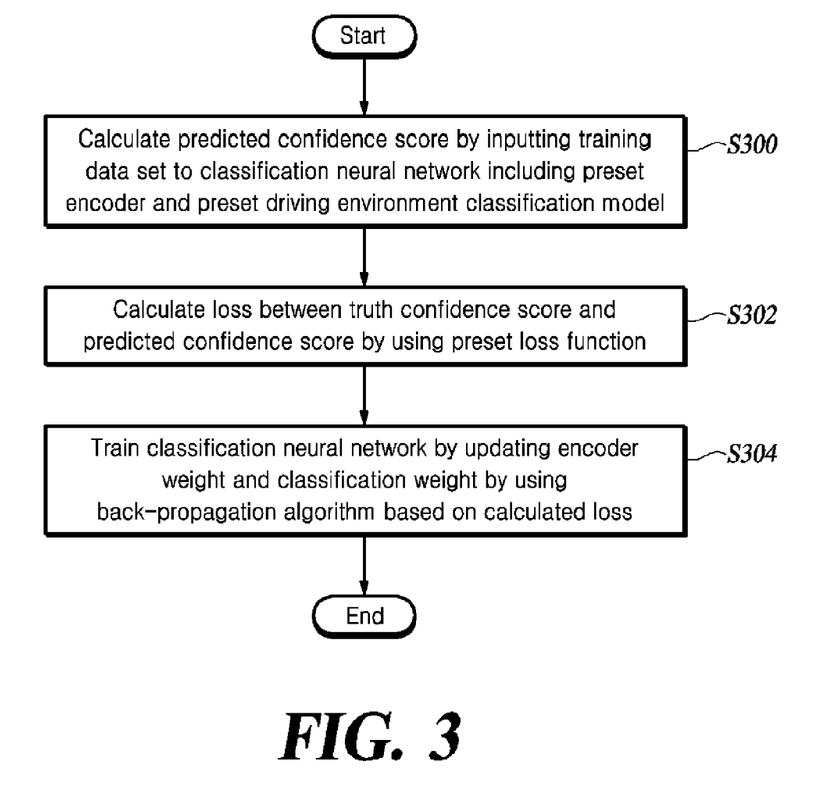
FIG. 3 is a flowchart for describing processes included in a method of training, by the driving environment classification device, a classification neural network according to an embodiment of the present disclosure.

FIG. 3 is a flowchart for describing processes included in a method of training, by the driving environment classification device, a classification neural network according to an embodiment of the present disclosure.

The estimated value calculator 210 calculates a predicted confidence score by inputting a training data set to the classification neural network including the preset encoder and the preset driving environment classification model (S300). A detailed method of calculating, by the encoder and the driving environment classification model, a confidence score has been described with reference to FIG. 2, and thus a further description thereof is omitted.

The loss calculator 212 calculates a loss, that is, an error between a truth confidence score and the predicted confidence score by using a preset loss function (S302). A detailed example of the loss function used by the loss calculator 212 has been described with reference to FIG. 2, and thus a detailed description thereof is omitted.

The model trainer 214 trains the classification neural network by updating at least one encoder weight included in the preset encoder and at least one classification weight included in the preset driving environment classification model by using the back-propagation algorithm based on the calculated loss (S304). A method of updating a weight of at least one hidden layer included in a deep neural network by using the back-propagation algorithm has been known in a corresponding technology, and thus a further description thereof is omitted.

Figure 4:
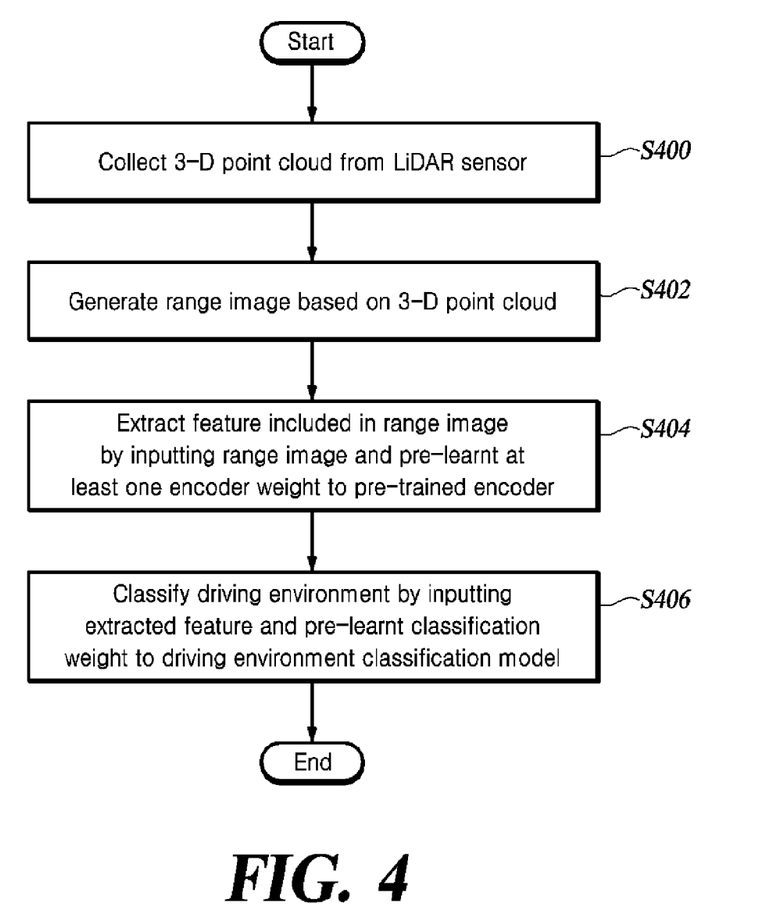
FIG. 4 is a flowchart for describing processes included in a driving environment classification method according to an embodiment of the present disclosure.

FIG. 4 is a flowchart for describing processes included in a driving environment classification method according to an embodiment of the present disclosure.

The data collector 202 collects a 3-D point cloud from a LiDAR sensor (S400).

The image generator 204 generates a range image based on the 3-D point cloud (S402).

The image processor 206 extracts at least one feature included in the range image by inputting the range image and a pre-learnt at least one encoder weight to the pre-trained encoder (S404).

The driving environment determiner 208 classifies a driving environment by inputting the at least one feature and a pre-learnt at least one classification weight to the pre-trained driving environment classification model (S406).

The driving environment classification device according to an embodiment of the present disclosure is a lightweight device, and uses a pseudo-image representation method for a point cloud also called a range image. Accordingly, the driving environment classification device enables analysis based on data-driven learning using an end-to-end supervised method and an approach to a wide FoV by overcoming the limit of a hand-engineered feature. The driving environment classification method according to an embodiment of the present disclosure has an effect in that it is robust against a dynamic scenario meaning an actual environment around a vehicle because the method does not depend on a specific ROI or a hand-crafted feature unlike a conventional method.

Effects of the driving environment classification method according to an embodiment of the present disclosure are various as follows. First, in a method of detecting weather and road conditions based on the deterioration of a LiDAR point cloud, in which environment an autonomous driving system is driven can be understood. Detection based on the deterioration of the LiDAR point cloud is essential in developing a robust perception stack. Second, the environment classification using the method of the present disclosure may be used to activate a safety device mechanism in adverse conditions in order to prevent a hazardous behavior. Third, the function for individually classifying a weather condition with respect to each sensor guarantees redundancy required for a system whose safety is important, and removes mutual dependency between sensors. Fourth, the function for classifying various road conditions, such as full snow coverage, slushy, dryness, and dampness, may assist a lane, the ground, and road-edge detection based on LiDAR in addition to a vehicle safety control application and brake assistance. Fifth, if the driving environment classification method is used, a weight of the sensor fusion algorithm can be adjusted using confidence scores for predicting various weather and road conditions. Sixth, the driving environment classification method can obtain classification results having more robust and better performance compared to a conventional method because the driving environment classification method provides the processing of a holistic wide LiDAR FoV including a data-driven feature.

A methodology for classifying a driving environment, which is proposed by the present disclosure, may be referred to as RangeWeatherNet. According to research of inventors, the accuracy of classification of the driving environment classification device according to the present disclosure has performance which is 11.8% better than that of a conventional method. The driving environment classification device includes a lightweight core network having 1.83 million parameters. The core network operates at 102 fps along with a data pre-processing step that reaches 32 frames per second (fps). Such a speed of the core network is a numerical value higher than a collection period of a conventional LiDAR optical front end.

As described above, disclosed are a method and device for classifying a driving environment according to an embodiment may provide a method and device for classifying a surrounding environment of a vehicle without depending on a specific ROI or hand-crafted feature of a LiDAR point cloud.

As described above, disclosed are a method and device for classifying a driving environment according to an embodiment may provide a data-driven learning method using an end-to-end supervised manner based on data collected using three-dimensional (3-D) LiDAR.

As described above, disclosed are a method and device that enable an environment in which a vehicle is driven to be classified without depending on a specific ROI or hand-crafted feature of a LiDAR point cloud because the data-driven learning method using the end-to-end supervised manner is used.

As described above, disclosed are a method and device that provide redundancy required for a system whose safety is important is guaranteed and mutual dependency between sensors is removed because weather conditions are individually classified with respect to each of sensors.

As described above, disclosed are a method and device that enable a weight of the sensor fusion algorithm is adjusted using a confidence score for the prediction of various weather and road conditions.

In the flowchart, the processes are described as being sequentially executed, but merely illustrate the technical spirit of some embodiments of the present disclosure. In other words, a person having ordinary skill in the art to which some embodiments of the present disclosure pertain may variously modify and apply the present disclosure by changing and executing the processes described in the flowchart or executing one or more of the processes in parallel without departing from an intrinsic characteristic of some embodiments of the present disclosure, and thus the flowchart is not limited to a time-series sequence.

Various implementation examples of the device and method described in this specification may be realized as a digital electronic circuit, an integrated circuit, a field programmable gate array (FPGA), an application specific integrated circuit (ASIC), computer hardware, firmware, software and/or a combination of them, such as, for example, one or more computer programs executable on a programmable system. The programmable system may include at least one programmable processor (this may be a special-purpose processor or a general-purpose processor) connected thereto in a way to receives data and instructions from a storage system, at least one input device, and at least one output device and to transmit data and instructions thereto. For example, the programmable system may be one of a server, a network device, a set-top box, an embedded device, a computer extension module, a personal computer, a laptop, a personal data assistant (PDA), a cloud computing system or a mobile device.

The driving environment classification device, data collector, data collector, image generator, image generator, image processor, image processor, driving environment determiner, driving environment determiner, estimated value calculator, estimated value calculator, loss calculator, loss calculator, model trainer, model trainer, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

REFERENCE NUMERALS

200: Driving environment classification device
202: Data collector
204: Image generator
206: Image processor
208: Driving environment determiner
210: Estimated value calculator
212: Loss calculator
214: Model trainer

What is claimed is:

1. A driving environment classification device, comprising:
one or more processors, the one or more processors being configured to:
collect a three-dimensional (3-D) point cloud from a light detection and ranging (LiDAR) sensor;
generate a range image based on the 3-D point cloud;
extract at least one feature from the range image by inputting the range image and a pre-learnt at least one encoder weight to a pre-trained encoder; and
classify a driving environment by inputting the at least one feature and a pre-learnt at least one classification weight to a pre-trained driving environment classification model,
wherein, in classifying the driving environment, the one or more processors are configured to:
estimate at least one confidence score by inputting the at least one feature and the at least one classification weight to the driving environment classification model, and
determine, as the driving environment, a driving environment class having a highest confidence score as an output value,
wherein the at least one confidence score comprises a probability value for each driving environment class.

2. The driving environment classification device of claim 1, wherein:
the driving environment classification model comprises a weather classification model to classify weather and a road condition classification model to classify a condition of a road on which a vehicle travels, and
the at least one classification weight comprises a first weight pre-learnt with respect to the weather classification model and a second weight pre-learnt with respect to the road condition classification model.

3. The driving environment classification device of claim 1, wherein:
the driving environment class comprises a weather classes and a road condition class, and
the at least one confidence score comprises a weather confidence score corresponding to the weather class and a road condition confidence score corresponding to the road condition class.

4. The driving environment classification device of claim 1, wherein the one or more processors are configured to:
calculate a predicted confidence score by inputting a training data set to a classification neural network comprising a preset encoder and a preset driving environment classification model;
calculate a loss between a truth confidence score and the predicted confidence score using a preset loss function; and
train the classification neural network by updating an encoder weight included in the preset encoder and a classification weight included in the preset driving environment classification model using a back-propagation algorithm based on the loss.

5. The driving environment classification device of claim 4, wherein the one or more processors are configured to calculate the loss using a cross entropy error (CEE) for predicting categorical data as the loss function.

6. The driving environment classification device of claim 4, wherein:
the one or more processors are configured to calculate predicted confidence scores for weather and road conditions based on a preset first weight and a preset second weight, respectively,
the one or more processors are configured to calculate the loss using a joint loss function in which a level of contribution of each loss function is adjusted based on a first loss function for weather prediction and a second loss function for road condition prediction, and
the one or more processors are configured to train the classification neural network by recursively updating at least one weight included in the classification neural network based on a gradient of the joint loss function.

7. A driving environment classification method performed by a processor-implemented driving environment classification device, the driving environment classification method comprising:
collecting a three-dimensional (3-D) point cloud from a LiDAR sensor;
generating a range image based on the 3-D point cloud;
extracting at least one feature from the range image by inputting the range image and a pre-learnt at least one encoder weight to a pre-trained encoder; and
classifying a driving environment by inputting the at least one feature and a pre-learnt at least one classification weight to a pre-trained driving environment classification model,
wherein the classifying of the driving environment comprises:
estimating at least one confidence score by inputting the at least one feature and the at least one classification weight to the driving environment classification model, and
determining, as the driving environment, a driving environment class having a highest confidence score as an output value,
wherein the at least one confidence score comprises a probability value for each driving environment class.

8. The driving environment classification method of claim 7, wherein:
the driving environment classification model comprises a weather classification model for classifying weather and a road condition classification model for classifying a condition of a road on which a vehicle travels, and
the at least one classification weight comprises a first weight pre-learnt with respect to the weather classification model and a second weight pre-learnt with respect to the road condition classification model.

9. The driving environment classification method of claim 7, wherein:
the driving environment class comprises a weather classes and a road condition class, and
the at least one confidence score comprises a weather confidence score corresponding to the weather class and a road condition confidence score corresponding to the road condition class.

10. The driving environment classification method of claim 7, further comprising:
   calculating a predicted confidence score by inputting a training data set to a classification neural network comprising a preset encoder and a preset driving environment classification model;
   calculating a loss between a truth confidence score and the predicted confidence score using a preset loss function; and
   training the classification neural network by updating an encoder weight included in the preset encoder and a classification weight included in the preset driving environment classification model using a back-propagation algorithm based on the loss.

11. The driving environment classification method of claim 10, wherein the calculating of the loss comprises calculating the loss using a cross entropy error (CEE) for predicting categorical data as the loss function.

12. The driving environment classification method of claim 10, wherein:
   the calculating of the predicted confidence score comprises calculating predicted confidence scores for weather and road conditions based on a preset first weight and a preset second weight, respectively,
   the calculating of the loss comprises calculating the loss using a joint loss function in which a level of contribution of each loss function is adjusted based on a first loss function for weather prediction and a second loss function for road condition prediction, and
   the training of the classification neural network comprises training the classification neural network by recursively updating at least one weight included in the classification neural network based on a gradient of the joint loss function.

13. The driving environment classification method of claim 7,
   wherein generating the range image comprises spherically projecting the 3-D point cloud onto the range image, and
   wherein the range image includes information on a distance, an intensity and 3-D cartesain coordinates of each of a plurality of projected points.

14. The driving environment classification device of claim 1,
   wherein the one or more processors are configured to generate the range image by spherically projecting the 3-D point cloud onto the range image, and
   wherein the range image includes information on a distance, an intensity and 3-D cartesain coordinates of each of a plurality of projected points.

* * * * *